United States Patent [19]

Schwarz

[11] 4,207,752
[45] Jun. 17, 1980

[54] METHOD AND APPARATUS FOR RECOVERING HEAT FROM WASTE WATER

[76] Inventor: Michael Schwarz, 963 Choquette Blvd., Beloeil P.Q., Canada

[21] Appl. No.: 940,126

[22] Filed: Sep. 6, 1978

[51] Int. Cl.$^2$ .................... F25B 27/02; G05D 23/00
[52] U.S. Cl. ........................ 62/238; 165/35; 165/DIG. 12
[58] Field of Search ............ 165/35, DIG. 12; 62/238 E; 126/362; 137/337

[56] References Cited

U.S. PATENT DOCUMENTS

| | | | |
|---|---|---|---|
| 2,575,325 | 11/1951 | Ambrose et al. | 62/238 E |
| 2,632,306 | 3/1953 | Ruff | 62/238 E |
| 2,802,342 | 8/1957 | Gray | 62/238 E |
| 3,946,802 | 3/1976 | Christenson | 165/35 |
| 3,986,345 | 10/1976 | Pilz et al. | 62/238 E |

FOREIGN PATENT DOCUMENTS

2307235  5/1975  France ................................ 62/238 E

*Primary Examiner*—Lloyd L. King
*Attorney, Agent, or Firm*—Schwartz, Jeffery, Schwaab, Mack, Blumenthal & Koch

[57] ABSTRACT

The apparatus comprises a first container for receiving waste water. Inlet means in the upper portion of the first container are adapted to be connected to a drain pipe. Outlet means in the bottommost portion of the container are provided for draining the waste water from the container. Valve means are provided which are operable to control the outlet means in response to a waste water level and relative heat indicator in said first container, and a second container for receiving a liquid is adjacent but sealed from said first container. Heat pump means include heat exchanger means in said first container and communicate with heat exchanger means in the second container whereby heat is extracted from relatively warm waste water in the first container and can be transferred to the heat exchanger in said second container for warming a relatively cooler liquid in said second container.

6 Claims, 3 Drawing Figures

# METHOD AND APPARATUS FOR RECOVERING HEAT FROM WASTE WATER

BACKGROUND OF THE INVENTION

1. Field of the Invention

The present invention relates to the conservation of energy, and particularly to a method and apparatus for recovering heat from waste water.

2. Description of the Prior Art

In the light of rapid increases in energy costs coupled with the realization that our energy resources are limited, ways must be found to utilize to the maximum such energy sources as heat. One area where heat is wasted is in the household. For instance, energy resources are utilized in order to heat cold water entering a building from the water main. However, the use of the hot water in a house is often only momentary, i.e., a shower, bath, dishwashing, clothes washing, etc. The water that goes down the drain, from such usage, still retains a high percentage of its heat. However, the energy from the draining hot water is not utilized.

U.S. Pat. No. 3,946,802, issued Mar. 30, 1976, Christenson, describes the utilization of heat from waste water in a dwelling. The system describes collecting drain water in a vertically aligned heat exchanger through which is passed the cold in-coming water in coils in the heat exchanger.

SUMMARY OF THE INVENTION

It is an aim of the present invention to provide an improved, more efficient method and apparatus for removing heat from waste water.

It is a further aim of the present invention to provide an improved method and apparatus for utilizing the heat recovered from the waste water to preheat the cold water entering the house from the water main.

A construction in accordance with the present invention comprises a first container for receiving waste water, inlet means in the upper portion of said first container adapted to be connected to a drain pipe, outlet means in the bottommost portion of the container for draining the waste water from the container, valve means operable to control the outlet means in response to a waste water level and relative heat indicator in said first container, a second container for receiving a liquid adjacent but sealed from said first container, heat pump means including heat exchanger means in said first container and communicating with heat exchanger means in the second container whereby heat is extracted from relatively warm waste water in the first container and can be transferred to the heat exchanger in said second container for warming a relatively cooler liquid in said second container.

A method in accordance with the present invention includes the steps of accumulating waste water in a first accumulation container, accumulating a relatively cooler liquid in a second container, passing a refrigerant fluid through an expansion heat exchanger in the first container, compressing the fluid and condensing it in a condenser heat exchanger in the second container allowing the liquid in the second container to be warmed, allowing the refrigerant gas to expand in the heat exchanger in the first container thereby absorbing heat from the warmer liquid in the first container, and draining said first container when the temperature of the waste water has been sufficiently reduced.

In a more specific embodiment, the second container includes an inlet connected to a cold fresh water source and an outlet connected to the intake of a hot water tank.

BRIEF DESCRIPTION OF THE DRAWINGS

Having thus generally described the nature of the invention, reference will now be made to the accompanying drawings, showing by way of illustration, a preferred embodiment thereof, and in which.

DESCRIPTION OF THE PREFERRED EMBODIMENTS

Figure 1:
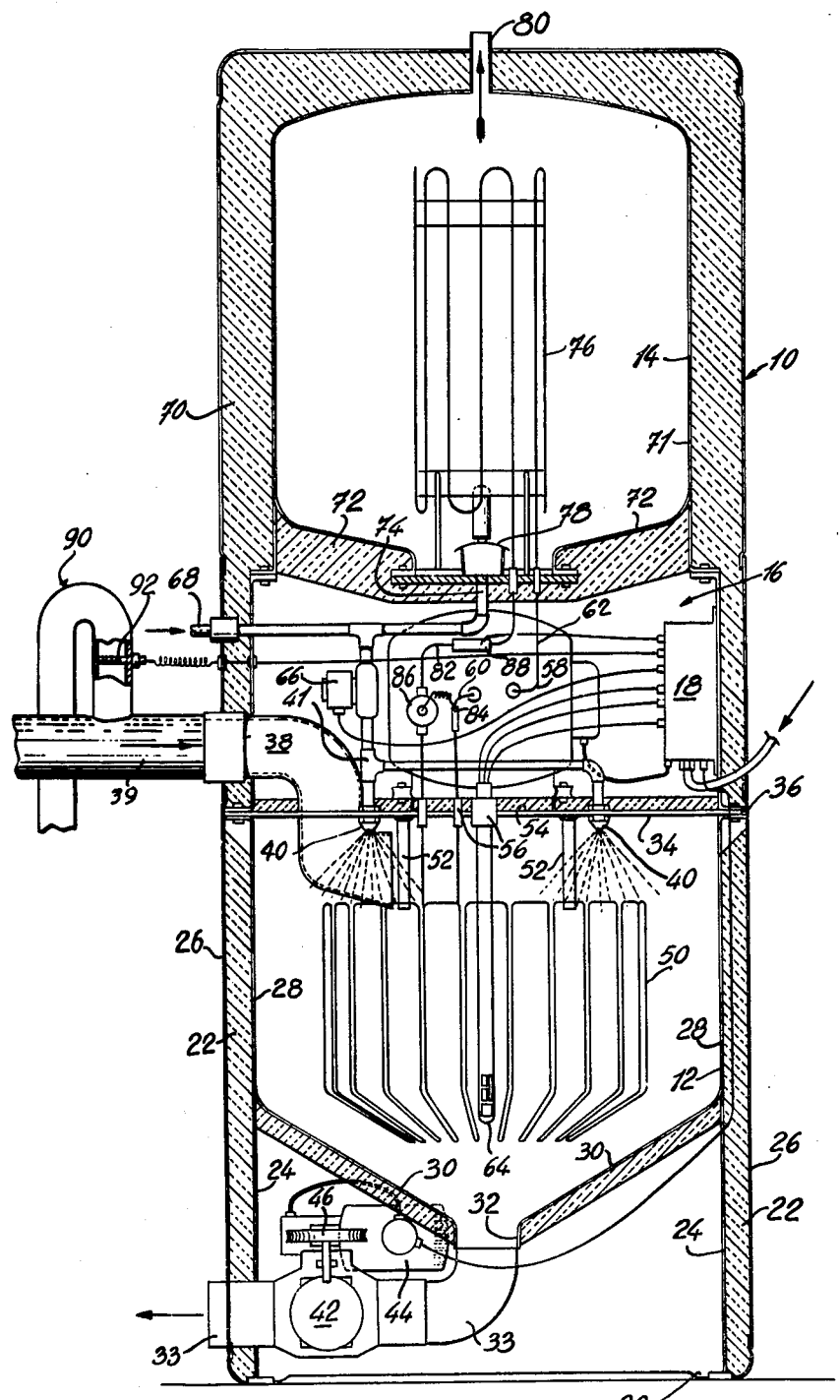
FIG. 1 is a vertical cross-sectional view taken through a prewarming unit in accordance with an embodiment of the present invention.

Referring now to FIG. 1, there is illustrated the prewarmer unit 10 having the overall shape and size of a typical 60-gallon hot water insulated tank which would normally be installed adjacent a conventional hot water tank in a household. The unit 10 includes a lower portion containing the waste water container 12. Disposed vertically above the waste water container is the fresh water container 14 and separating the two containers 12 and 14 is the heat pump apparatus 16 and a control panel 18.

The lower section includes a floor support 20 and an insulated cylindrical lower wall 22. The wall 22 might be double walled as shown by the inner sheet 24 and outer sheet 26 and be filled with insulation material. The container 12 includes a wall section 28 of cylindrical shape termination in a lower conical segment 30 which in turn defines a drain opening 32. The inside of the container 12 is covered with a smooth surface of polytetrafluoroethylene and all the corners are rounded. A top cover 34 is bolted to a flange 36 on the periphery of the cylindrical wall 28. An intake pipe 38 is located in the top portion of the container 12 and is adapted to be connected to the waste water drain of a household. It is to be noted, however, that the plumbing must be modified such that the drain from the toilets is kept separate from the waste water drain.

A shower apparatus 40 is associated in the top of the container 12 and is connected to the cover 34 and directed downwardly within the container. In this embodiment, two shower heads 40 are shown. The shower heads are connected by pipes 41 to a water main 68. A valve 66 controls the water to the shower system 40.

The drain 32 connects to a drain pipe 33 in which is provided a valve 42 operated by a gear 46 which in turn is rotated by means of a motor 44.

Figure 2:
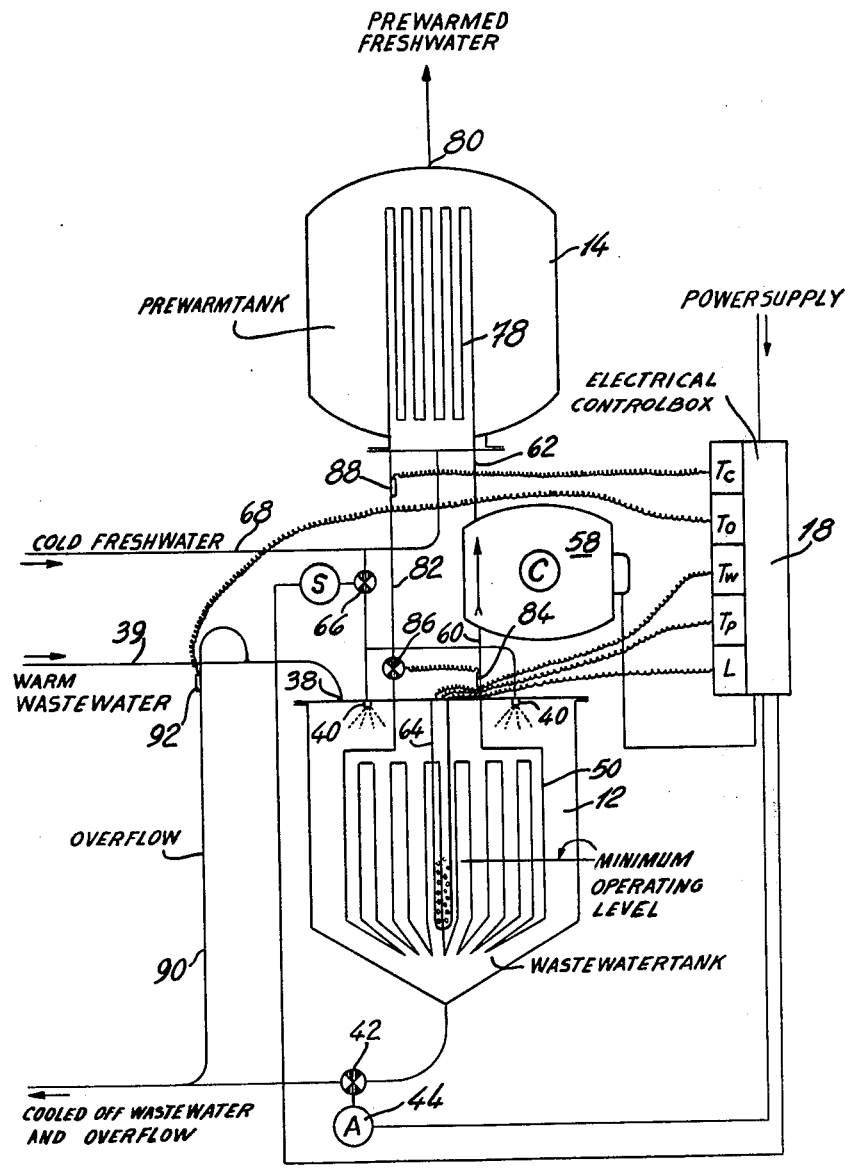
FIG. 2 is a schematic view of the unit shown in FIG. 1.

Within the waste water container 12, there is provided a continuous heat exchanger tube, either in coil or in the pattern shown schematically in FIGS. 1 and 2, and is supported or hung from the cover 34 by means of the supports 52. Insulation material 54 is provided on the cover 34.

A compressor 58 is illustrated above the cover 34 and forms part of the heat pump 16. A tube 60 extends from the heat exchanger 50 to communicate with the compressor 58. A sensor device 64 is located centrally of the waste water container 12 and is supported by the cover 34 by means of a bushing 56.

The top section includes an insulated upper wall 70 having thick insulation material and the inner wall 71 terminates in the bottom wall section 72. An inlet 74 is provided in the bottom wall 72 and communicates with the cold water main 68. A baffle 78 is provided to cover the inlet 74 to prevent splashing of the cold fresh water onto the heat exchanger 76 which is supported and located centrally within the container 14. The tank 14 is also provided with an outlet 80 in the upper section thereof which communicates with the conventional hot water tank of the household. A tube 62 leads from the compressor 58 to the heat exchanger 76 in the fresh water container 14. Finally, in order to complete the circuit of the heat pump, a tube 82 extends from the heat exchanger 76 to the heat exchanger 50. An expansion valve 86 is provided in the tube 82 and is connected to a thermostat 84 located in the tube 60. A thermostat 88 is provided in the tube 82 and leads to the control box at terminal Tc.

An overflow pipe 90, as shown in FIG. 2, is connected to the waste water line prior to the inlet 38. A thermostat 92 is located in the overflow drain pipe 90 and is connected to the terminal To in the control box 18. The overflow 90 leads to the drain eventually.

Figure 3:
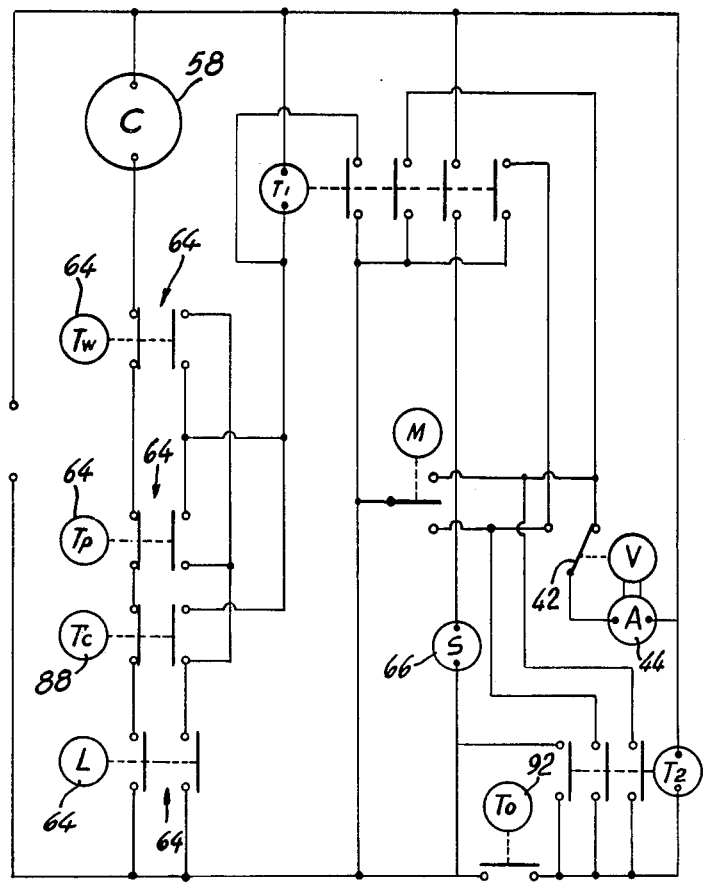
FIG. 3 is a wiring diagram showing the typical wiring for the controls of the unit.

Referring to FIG. 2 as well as to the circuit diagram of FIG. 3, the remaining terminals of the control box are connected to the sensor device 64 and include a thermostat, connected to the terminal Tw, a freeze protection thermostat Tp, and a minimum level switch connected to terminal L. These devices are more clearly shown in the circuit diagram of FIG. 3. $T_1$ is a time delay device for maintaining the valve 42 open for draining the container 12 and the valve 66 for operating the showers 40, thus washing the container 12 while the drain is opened. The valves may be kept open for a short period of time, sufficient to flush out the container 12. The time delay device $T_2$ is used to maintain the valve 42 opened a short period of time after the valve has been opened in response to the thermostat 92 connected to terminal To when there is an overflow in pipe 90 so as to allow the colder water in the bottom of container 12 to be drained in order to make room for newer warmer drain water.

In operation, the waste water coming from a shower drain or other hot water appliance in the household enters through the inlet 38 into the waste water container 12. The waste water in the tank will merely accumulate until it reaches a predetermined level approximately half the height of the tank, whereby the minimum level switch in the sensor device 64 connected at L in the control box 18 will start the compressor 58, assuming the thermostat in the sensor 64 identified by the terminal Tw indicates that the water temperature of the waste water is above a predetermined temperature such as +8° C. The compressor 58 compresses the refrigerant gas in the heat pump system and forces the gas into the condenser heat exchanger 76 whereby the refrigerant gas will be condensed giving off heat to the water in the tank 14. The water in the container 14 will thereby be warmed, and fresh water coming from the main which is cold enters through the inlet 74 displacing the warm water through the outlet 80 to a hot water tank (not shown).

As the cool condensed refrigerant fluid exits from the condenser 76 through the tube 82, the temperature thereof is sensed by means of thermostat 88 connected to the terminal Tc in the control box. The fluid then passes through the expansion valve 86 which is controlled by a thermostat connected in the tube 60 leading to the compressor from the expansion heat exchanger 50. The cool refrigerant then enters the expansion heat exchanger 50, and the heat of the waste water in the container 12 will further expand the refrigerant gas which will again start the cycle. Of course, if the refrigerant gas exiting from the heat exchanger 76 through pipe 82 is above a certain predetermined temperature, as will be sensed comparatively by the thermostat 88, the compressor 58 will be deactivated. Only if it is sensed that the fluid is below a certain temperature will this system be kept activated.

Once the temperature of the waste water held in the container 12 is lowered below a certain predetermined temperature sensed by the sensor 64 and the temperature of the fresh water in the container 14 has increased, the drain valve 42 will be opened, allowing the waste water to empty from the container 12. At that time, the valve 66 will be opened to operate the shower system thereby washing out the container 12. After a certain time delay, the valve 42 will again be closed, and waste water will again be allowed to enter into the tank 12 without being drained.

When the waste water fills the tank 12, any further waste water will be bypassed to the overflow pipe 90. The thermostat 92 connected to terminal To in the control box will record the temperature of the waste water being bypassed, and if it is found that, on comparison with the waste water in the container 12, the temperature of the water being bypassed is above a certain temperature, then the valve 42 will be operated to drain the colder waste water from the bottom of container 12 and allow newly used warmer waste water to collect in the container 12.

I claim:
1. An apparatus for recovering heat from waste water, the apparatus comprising:
   a first container for receiving waste water;
   inlet means in the upper portion of said first container adapted to be connected to a drain pipe from hot water facilities;
   outlet means in the bottommost portion of said first container for draining the waste water from the first container;
   valve means operable to control said outlet means in response to a waste water level indicator and a relative heat indicator;
   a second container for receiving a liquid to be prewarmed, said second container being separate from said first container;
   heat pump means including heat exchanger means in said first container and communicating with heat exchanger means in said second container, whereby heat is extracted from relatively warm waste water in the first container and is transferred to said heat exchanger in said second container for warming the relatively cooler liquid in said second container;
   overflow outlet means and bypass means cooperating with said first container, whereby waste water may bypass said first container without passing through said outlet means in said bottommost portion of said first container;
   means for comparing the temperature of the water passing through said overflow outlet means and the temperature of the waste water in said first container; and means operating said valve means to drain part of said first container when the water passing through said bypass means is of a higher temperature than the water in said first container, thus to allow the warmer waste water to enter said first container.

2. An apparatus as defined in claim 1, wherein said overflow outlet means is adapted for connection with a waste water drain upstream of said inlet means.

3. An apparatus as defined in claim 1, wherein the first container has an inverted cone-shaped bottom wall with said outlet means being centrally located of the inverted cone, and means for washing the first container when it is empty.

4. An apparatus as defined in claim 1, wherein the second container is located in vertical alignment with the first container, and the heat pump includes a compressor located between the first and second containers and communicating with said heat exchanger means in said second container, which heat exchanger means is a condenser heat exchanger means and with said heat exchanger in said first container, which latter heat exchanger means is an evaporator heat exchanger means, the whole being contained in a housing which is thermally insulated.

5. An apparatus as defined in claim 4, wherein means are provided for actuating the compressor of the heat pump comprising a thermostat in the first container and a minimum level switch in the first container, and means for determining the relative temperatures of the fluid of the heat pump coming from the first heat exchanger and entering the first heat exchanger.

6. An apparatus as defined in claim 1, wherein the second container is connected to a fresh water main for a household and discharges into a hot water tank such that the cold water entering into the second container is prewarmed before entering the hot water tank.

* * * * *